United States Patent [19]

Asano et al.

[11] 4,165,932
[45] Aug. 28, 1979

[54] DATA PRINTING DEVICE FOR CAMERA

[75] Inventors: Seiji Asano, Okegawa; Akio Ohmiya, Omiya, both of Japan

[73] Assignee: Fuji Photo Optical Co., Ltd., Omiya, Japan

[21] Appl. No.: 795,444

[22] Filed: May 10, 1977

[30] Foreign Application Priority Data

May 12, 1976 [JP] Japan .............................. 51-59687[U]

[51] Int. Cl.² ...................... G03B 13/08; G03B 17/24
[52] U.S. Cl. ..................................... 354/106; 354/225
[58] Field of Search ..................... 354/105, 106, 10 R, 354/219, 224, 225, 107, 108; 355/40; 352/90

[56] References Cited

U.S. PATENT DOCUMENTS

| 3,329,476 | 7/1967 | Whitney ............................ 352/90 X |
| 3,393,623 | 7/1968 | Gutmann et al. ................ 354/219 X |
| 4,001,850 | 1/1977 | Fujita ............................... 354/106 X |
| 4,028,713 | 7/1977 | Ohashi et al. ...................... 354/106 |

Primary Examiner—Michael L. Gellner
Attorney, Agent, or Firm—Harold L. Stults; William S. Frommer

[57] ABSTRACT

In a data printing device built in a camera body, the data carrying disc is located close to the bright frame in the viewfinder optical system so that the data may be viewed together with the bright frame in the viewfinder without an additional diopter correcting lens. The data carrying plate consists of a number of discs carrying different data of different diameter so that the data carrying portions of the different data carrying discs may face to the film in the camera directly, namely without any intervention between the data carrying portions and the film, whereby sharp images of the data are printed. A light intercepting plate is provided in parallel to the data carrying discs to selectively print the data.

2 Claims, 8 Drawing Figures

DATA PRINTING DEVICE FOR CAMERA

BACKGROUND OF THE INVENTION

1. Field of the Invention

This invention relates to a data printing device for a camera, and more particularly to a data printing device built in a camera body in which the data to be printed on the film in the camera can be viewed through the viewfinder of the camera.

2. Description of the Prior Art

It has been known in the art to provide a data printing device in a camera body to print data such as the date of the photographing. Further, it has been proposed to make the data to be printed be viewable through the viewfinder of the camera as disclosed in U.S. patent application Ser. No. 654,757 filed Feb. 3, 1976, now U.S. Pat. No. 4,085,412 filed by the instant applicant. It is desirable that the data be viewable through the viewfinder in order that the data to be printed can be confirmed.

In the camera provided with the data printing device in which the data can be viewed through the viewfinder, the optical system in the camera is markedly complicated because a diopter correction lens is needed in the optical path of the data viewing system in addition to the normal viewfinder optical system including a bright frame, a mark for zone focussing, a frame for indicating numerals for adjusting a pointer of an exposure meter and a diopter correction lens for the various marks and frames which are viewed together with the image of the object to be photographed.

Further, it has been a defect in the conventional camera with the data printing device that the numerals or characters indicating the data are liable to be blurred since a plurality of data carrying plates are superposed with each other. It is another disadvantage of the conventional camera with the data printing device that the number of parts is increased and the cost is high since the data printing device is provided with an externally operable manual switch for selectively turning on or off the light source in the device so that the data may be printed only when the photographer desires to print the data on the film.

SUMMARY OF THE INVENTION

It is the primary object of the present invention to provide a data printing device for a camera in which the optical system in the camera is simplified.

Another object of the present invention is to provide a data printing device for a camera in which data can be printed very clearly on the film.

Still another object of the present invention is to provide a data printing device for a camera in which the structure of the camera is not complicated by the data printing selecting means which is operated to selectively print the data only when the print of the data is desired.

The above objects of the present invention are accomplished by providing the data carrying means at a position close to the frames or marks in the viewfinder optical system, more exactly at a position within the range of diopter correction of the diopter correcting lens provided for the frames and marks. In order to accomplish the above second object, the data carrying means comprising a plurality of data carrying plates is so constructed that the data carrying plates are not superposed with each other. The last object mentioned above is accomplished by providing a light intercepting means in the data printing device so that the printing of the data can be prevented simply by bringing the light intercepting means into the optical path of the data printing device. Namely, an electric switch which is manually operable from outside of the camera body is not provided.

DESCRIPTION OF THE PREFERRED EMBODIMENTS

Figure 1:
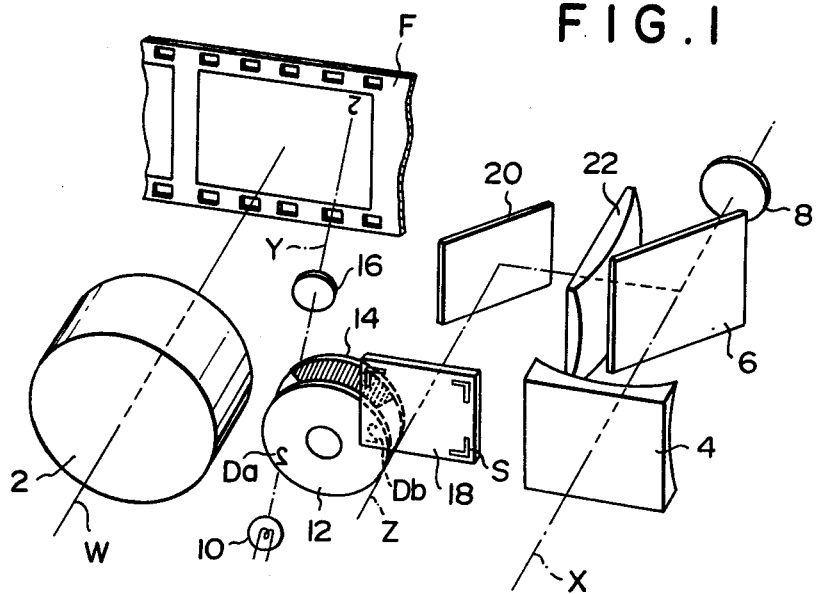
FIG. 1 is a perspective view showing the optical system of the viewfinder of a camera provided with the data printing device in accordance with an embodiment of the present invention.
Figure 2:
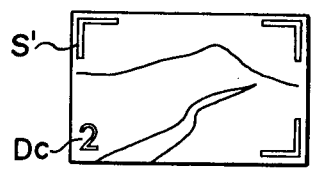
FIG. 2 is a front view showing the field of view observed through the viewfinder.

Referring to FIG. 1, an objective 2 having an optical axis W is located in front of a film F in the camera body to focus an image of the object to be photographed. An objective 4 of a viewfinder is located in front of an eyepiece 8 having an optical axis X. Between the objective 4 and the eyepiece 8 is provided a half-transparent mirror 6 to reflect light coming from a bright frame carrying window plate 18 toward the eyepiece 8. A data carrying plate 12 and a light intercepting plate 14 are provided in front of the film F by way of a focusing lens 16 located therebetween. The focusing lens 16 has an optical axis Y passing through the data carrying plate 12 and the film F. On the optical axis Y and on the opposite side of the data carrying plate 12 with respect to the focusing lens 16 is provided a light source 10. Said window plate 18 carries a bright frame S and has an optical axis Z passing through the center thereof and extending to said mirror 6 by way of a mirror 20 and a diopter correction lens 22. The bright frame carrying window plate 18 is illuminated by the ambient light and makes the bright frame S viewed through the eyepiece 8 together with the view of the object to be photographed observed through the objective 4 of the viewfinder optical system as shown in FIG. 2.

The data carrying plate 12 has a plurality of different data each consisting of a pair of the same numeral or character. In FIGS. 1 and 2, a numeral "2" is shown to be carried by the plate 12 and printed on the film F and further viewed through the viewfinder. The data carrying plate 12 has a numeral Da to be printed and another numeral Db to be viewed through the viewfinder as the data Dc.

In the present invention, the data carrying plate 12 is located close to the bright frame carrying window plate 18 so that both the bright frame S and the data Db are within the range of diopter correction of the diopter correcting lens 22. Therefore, it is not necessary to provide an additional diopter correcting lens for the data carrying plate as provided in the conventional camera.

Figure 5:
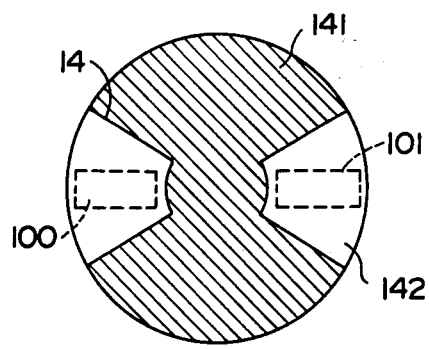
FIG. 5 is a plan view of a light intercepting plate employed in the data printing device in accordance with the present invention.

The light intercepting plate 14 is used for intercepting the light from the light source 10 along the optical axis Y when the printing of the data is not desired. The light intercepting plate 14 is shown in detail in FIG. 5. The light intercepting plate 14 has a light intercepting portion 141 and a light passing portion 142. In FIG. 5, within the light passing portion 142 are indicated a section 100 for recording data and a section 101 for viewing data. When the data should be printed, the light passing portion 142 is brought to the position as shown in FIG. 5. When the data are not to be printed, the light intercepting portion 141 is brought into alignment with the sections 100 and 101. Thus, the selection of the data printing can be simply conducted without turning on or off the light source.

Figure 3:
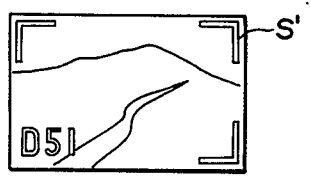
FIG. 3 is also a view showing the field of view of the viewfinder in which different data from that shown in FIG. 2 is observed.
Figure 4A:
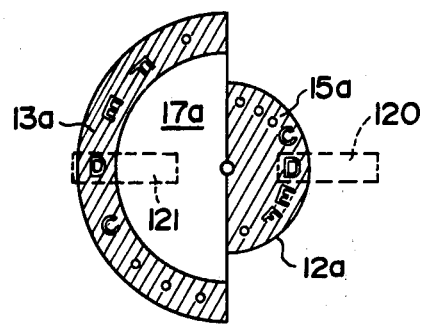
FIG. 4A is a plan view of the first data carrying disc of the data carrying means of the data printing device of this invention.
Figure 4B:
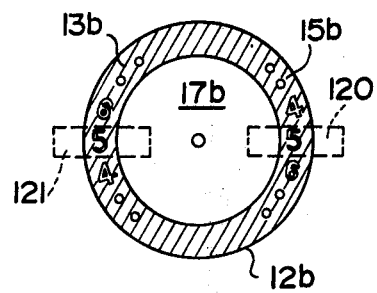
FIG. 4B is a plan view of the second data carrying disc thereof.
Figure 4C:
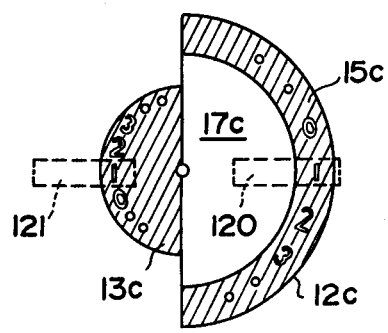
FIG. 4C is a plan view of the third data carrying disc thereof.
Figure 6:
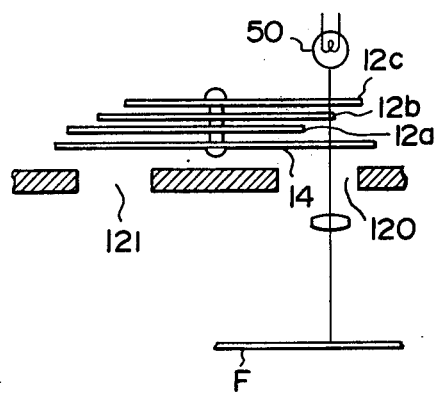
FIG. 6 is a side view partly in section showing the data carrying means and an optical system for printing the data on a film in the camera employed in the data printing device of the present invention.

In FIG. 3, data of "D51" are indicated in the field of view of the viewfinder. This means that the same data is printed on the film. Further, in this embodiment, the combination of the character and the numerals can be changed. In such an embodiment, a plurality of data carrying discs are employed as shown in FIGS. 4A, 4B and 4C. The first data carrying disc 12a carries alphabets including "D". The second data carrying disc 12b carries numerals including "5". The third data carrying disc 12c carries numerals including "1". The first data carrying disc 12a has a data carrying arcuate portion 13a of comparatively large diameter on one hand and a data carrying semicircular portion 15a on the other. The data carrying arcuate portion 13a and the data carrying semi-circular portion 15a are connected by means of a transparent semi-circular portion 17a. The data carrying arcuate portion 13a is aligned with a viewing window 121 and the data carrying semicircular portion 15a is aligned with a printing window 120. The second data carrying disc 12b has a data carrying annular portion consisting of a first semi-annular portion 13b carrying data to be viewed and a second semi-annular portion 15b carrying data to be printed. The third data carrying disc 12c has a data carrying semicircular portion 13c of comparatively small diameter on one hand and a data carrying arcuate portion 15c on the other. The data carrying arcuate portion 15c has a comparatively large diameter. The two portions 13c and 15c are connected by means of a transparent semi-circular portion 17c. The second data carrying disc 12b also has a transparent portion 17b in the annular portion as shown in FIG. 4B. The shape of the third data carrying disc 12c and the shape of the first data carrying disc 12a are symmetric with each other. Each data carrying disc has the same character or numeral at the symmetric position so that the same be aligned with the two windows 120 and 121. When these three discs 12a, 12b and 12c are superposed with their center aligned, the data carrying portions are not superposed with each other since the diameter of the respective portions is different from each other as shown in FIG. 6. Further, it should be noted that the data carrying portions 15a, 15b and 15c are directly faced to the film F, that is, there is no light diffusing member between each data carrying portion and the film F. On the other hand, on the data viewing side aligned with the data viewing window 121, the data carried by the second and third data carrying discs 12b and 12c are viewed with the intervention of the transparent portions 17a and 17b of the other data carrying discs 12a and 12b. However, the blur or degradation of the image of the data viewed through the viewfinder do not practically affect on the quality of image of the data printed on the film F.

We claim:

1. A data printing device for a camera in which a bright frame is provided to be viewed through a viewfinder of the camera and a diopter lens is provided between the bright frame and the eyepiece of the camera whereby the bright frame is viewed through the viewfinder together with the object to be photographed, said data printing device comprising data carrying means which carries a first group of data to be optically printed on the film in the camera and a second group of data to be viewed through the viewfinder characterized in that said data carrying means is located close to said bright frame so that both the data carried by the data carrying means and the bright frame are located within the range of diopter correction of said diopter correcting lens, and further characterized in that a light intercepting member is selectively put into a position to intercept light passing through the data carried by said data carrying means toward the film for printing the data on the film and concurrently to intercept light passing through the data carried by said data carrying means toward said eyepiece, thereby preventing the printing and viewing of the data, said light intercepting member being a rotatable member provided in parallel to said data carrying means, and having a light intercepting portion and a light passing portion selectively put into alignment with the optical path of the light passing through the data carried by said data carrying means.

2. A data printing device as defined in claim 1 wherein said data carrying means comprises a plurality of concentrically rotatable discs carrying said first and second groups of data, said plurality of rotatable discs being arranged so that data carried by one of said discs is offset with respect to data carried by another disc.

* * * * *